United States Patent [19]
Distaso et al.

[11] Patent Number: 5,854,188
[45] Date of Patent: *Dec. 29, 1998

[54] WATER IN OIL EMULSIONS CONTAINING PYRROLE

[75] Inventors: John Distaso, Orange; Azucena G. De Guzman, Cerritos, both of Calif.

[73] Assignee: Elf Atochem North America, Inc., Philadelphia, Pa.

[*] Notice: This patent issued on a continued prosecution application filed under 37 CFR 1.53(d), and is subject to the twenty year patent term provisions of 35 U.S.C. 154(a)(2).

The term of this patent shall not extend beyond the expiration date of Pat. No. 5,821,209.

[21] Appl. No.: 804,649

[22] Filed: Feb. 25, 1997

[51] Int. Cl.[6] .............................. C09D 9/00; C09D 9/04; B08B 3/08

[52] U.S. Cl. .................... 510/206; 510/207; 510/203; 510/208; 510/209; 510/212; 510/417; 134/38

[58] Field of Search ...................... 510/206, 207, 510/203, 208, 209, 212, 417; 134/38

[56] References Cited

U.S. PATENT DOCUMENTS

| | | | |
|---|---|---|---|
| 4,732,695 | 3/1988 | Francisco | 252/162 |
| 5,011,621 | 4/1991 | Sullivan | 252/162 |
| 5,387,363 | 2/1995 | Distaso | 252/163 |
| 5,405,548 | 4/1995 | Distaso | 252/170 |
| 5,411,678 | 5/1995 | Sim | 252/548 |
| 5,425,893 | 6/1995 | Stevens | 252/166 |
| 5,427,710 | 6/1995 | Stevens | 252/166 |
| 5,454,985 | 10/1995 | Harbin | 252/558 |
| 5,478,491 | 12/1995 | Jarema | 252/171 |
| 5,518,661 | 5/1996 | Langford et al. | 252/364 |
| 5,569,410 | 10/1996 | Distaso | 510/202 |
| 5,637,559 | 6/1997 | Koreltz et al. | 510/201 |
| 5,744,438 | 4/1998 | Distaso | 510/207 |

*Primary Examiner*—Douglas J. McGinty

[57] ABSTRACT

Improvements in the rate of stripping of alkaline water-in-oil emulsions by incorporating in the organic phase thereof an effective amount of pyrrole.

10 Claims, No Drawings

WATER IN OIL EMULSIONS CONTAINING PYRROLE

FIELD OF THE INVENTION

The present invention relates to improvements in the stripping rate of alkaline paint stripping formulations comprising water-in-oil emulsions containing benzyl alcohol, the improvement resulting from incorporating in the oil phase thereof an effective amount of pyrrole.

BACKGROUND OF THE INVENTION

Benzyl alcohol based, alkaline water-in-oil emulsions to which this invention is directed are described, for example, in U.S. Pat. No. 5,387,363 (referred to herein as "the '363 patent") and in copending U.S. patent application Ser. No. 08/706,850 (referred to herein as "the '850 application"), the entire specifications of which are hereby incorporated by reference. Particularly preferred are those alkaline water-in-oil emulsions which contain a wax such as paraffin wax.

SUMMARY OF THE INVENTION

In alkaline paint stripper formulations containing a water-in-oil emulsion having a water phase and a continuous benzyl alcohol (oil) phase, but in the absence of any organic amine activator, an improvement is provided which comprises incorporating pyrrole in the benzyl alcohol phase in an amount effective to improve the stripping rate. Preferred embodiments include the incorporation of a terpene such as d-limonene to retard the rate of water evaporation and/or anisole to further enhance the stripping rate.

DETAILED DESCRIPTION OF THE INVENTION

It has now been found that incorporation of pyrrole into the organic, benzyl alcohol phase of an alkaline water-in-oil emulsion enhances the rate of stripping.

The wax-containing, alkaline water-in-oil emulsions described in the '850 application and the '363 patent are particularly advantageous in paint removers since the emulsions, among other things, reduce odor and the wax (natural or synthetic) improves the stripping efficiency by retarding evaporation of ingredients such as water and other volatiles that enhance stripping. When wax is present, it is generally used in an amount which is slightly in excess (1% by weight) of that which would saturate the organic phase. A preferred wax is paraffin wax (which term includes its individual components). Paraffin or mineral oil, vegetable wax, microcrystalline wax, ceresine wax and montan wax may similarly be used.

The pyrrole is generally used in an amount of from about 1.0 to about 24.0 weight %, based on the total weight of the emulsion (preferably from about 2 to about 24%, most preferably from about 8 to 24%), depending on the substrate to be stripped, the amount of solvents (and wax, if any) in the stripper formulation, and so on. The upper limit is a practical one, since additional pyrrole seems to have little effect on the stripping rate, while at levels below about 1% solvency can be lost.

One or more terpenes can also be added with the pyrrole, since the presence of a terpene helps to reduce evaporation of water and other solvents from these inverse emulsion paint strippers, so that the use life of such strippers can be extended to 24 hours or more. When using this combination, the pyrrole is preferably used in amounts of about 8–16%, while the terpene is preferably used in amounts of about 4–8%. Examples of such terpenes are d-limonene (preferred), dipentene (also known as 1-methyl-4-(1-methylethenyl)-cyclohexene), myrcene, alphapinene, linalool and mixtures thereof.

Anisole can also be added with the pyrrole to enhance the stripping rate, in which event the total amount of anisole and pyrrole is from about 1 to about 24% (preferably 2–16%), or with the pyrrole/terpene combination. When anisole, terpene(s) and pyrrole are all incorporated in the stripper, an optimized system is generally one which has about 8–16% anisole, about 5–9% terpene(s) and about 0.3–8% pyrrole.

The amount of wax incorporated in the emulsion of the preferred strippers is normally from about 0.02 to about 5.0 percent by weight, based on the total weight of the emulsion, more typically from about 0.1 to about 1.0%. Any type of commercially available paraffin wax or ceresine wax (or their components) can be used. Most paraffin waxes have a melting point in the range of about 47° to 65° C.

With reference to the '850 application and the '363 patent, a paint stripper formulation employing such an emulsion can be made by mixing together water; benzyl alcohol; any wax; pyrrole; up to about 2% by weight of thickeners (such as a hydroxypropyl cellulose or methylcellulose); up to about 15% by weight of a hydrocarbon solvent (aromatic or aliphatic, including petroleum distillates) to help wet the thickener and dissolve any wax; up to about 2% by weight of surfactants (such as sodium xylene sulfonate or an imidazoline such as oleic hydroxyethyl imidazoline); up to about 15% by weight of ammonia; up to about 5% by weight of corrosion inhibitors (such as 2-mercaptobenzotriazole, benzotriazole or sodium silicate); and, if desired, a small amount (usually no more than 0.1 to 0.3 grams per gallon) of a dye.

Examples (Nos. 1 to 7) of such paint remover formulations with optimized amounts of solvents of this invention are as follows (the ingredient amounts being listed in parts by weight), together with a comparative example (No. C1) having no pyrrole:

| | Example Nos: | | | | | | | |
|---|---|---|---|---|---|---|---|---|
| | 1 | 2 | 3 | 4 | 5 | 6 | 7 | C1 |
| benzyl alcohol | 40.0 | 40.0 | 40.0 | 40.0 | 40.0 | 40.0 | 40.0 | 40.0 |
| hydroxypropyl cellulose* | .5 | .5 | .5 | .5 | .5 | .5 | .5 | .5 |
| aromatic hydrocarbon solvent | .5 | .5 | .5 | .5 | .5 | .5 | .5 | .5 |
| paraffin wax | .3 | .3 | .3 | .3 | .3 | .3 | .3 | .3 |
| surfactant | .7 | .7 | .7 | .7 | .7 | .7 | .7 | .7 |
| corrosion inhibitors | 3.5 | 3.5 | 3.5 | 3.5 | 3.5 | 3.5 | 3.5 | 3.5 |
| ammonia | 5.0 | 5.0 | 5.0 | 5.0 | 5.0 | 5.0 | 5.0 | 5.0 |
| water | 41.5 | 25.5 | 25.5 | 29.5 | 33.5 | 29.0 | 25.5 | 49.5 |
| d-limonene | 0 | 0 | 0 | 4.0 | 8.0 | 5.5 | 8.0 | 0 |
| anisole | 0 | 0 | 12.0 | 0 | 0 | 11.5 | 8.0 | 0 |
| pyrrole | 8.0 | 24.0 | 12.0 | 16.0 | 8.0 | 3.5 | 8.0 | 0 |

*The amount of hydroxypropyl cellulose thickener was varied between 0.4 and 0.6 to compensate for varying viscosity due to varying amounts of solvent Comparative stripping tests were run on these formulations in standard performance tests on aluminum panels painted with a Polyurethane Topcoat System (polyurethane topcoat over an epoxy primer) or a Polyurethane Topcoat/Polyurethane Primer System (polyurethane topcoat over a polyurethane primer). The stripping tests followed MIL-R-81294, a military specification used to evaluate the effectiveness of paint strippers to remove a white polyurethane paint from aluminum. While no tests were done on Epoxy Topcoat Systems (epoxy topcoats over epoxy primers), previous experience has shown that results with Polyurethane Topcoat Systems are similar to that with Epoxy Topcoat Systems. The results of these tests are reported in Table I below, the data showing the percent of the panels stripped in 24 hours on each of the systems:

TABLE I

| Example No. | % of Panels Painted with Polyurethane/Polyurethane Stripped | % of Panels Painted with Polyurethane/Epoxy Stripped |
|---|---|---|
| C1* | 0 | 0 |
| 1* | 5 | 0 |
| 2 | 10 | 0 |
| 3* | 35 | 10 |
| 4* | 85 | 20 |
| 5 | 100 | 25 |
| 6 | 100 | 38 |
| 7 | 100 | 38 |

*These report an average of tests on two separately made formulation batches

Examples 1 and 2 show that pyrrole alone is effective for improved stripping on the Polyurethane Topcoat/Polyurethane Primer System. Improved stripping on both systems results from combinations of the pyrrole with a terpene (d-limonene) and/or anisole, the combinations containing both pyrrole and a terpene being particularly effective, as is evident from Examples 3–7.

What is claimed is:

1. In an alkaline paint stripper formulation which contains a water-in-oil emulsion having a water phase and a continuous benzyl alcohol phase, but which does not contain an organic amine activator, the improvement comprising incorporating pyrrole and at least one of d-limonene or anisole in the benzyl alcohol phase in an amount effective to increase the rate of stripping.

2. The paint stripper formulation of claim 1 wherein a wax is incorporated in the benzyl alcohol phase.

3. The paint stripper formulation of claim 2 wherein pyrrole and d-limonene are incorporated in the benzyl alcohol phase.

4. A method of increasing the stripping rate of an alkaline water-in-oil emulsion paint stripper which does not contain an organic amine activator, which method comprises incorporating into the emulsion's benzyl alcohol phase an effective amount of pyrrole and at least one of d-limonene or anisole.

5. The paint stripper formulation of claim 2 wherein pyrrole and anisole are incorporated in the benzyl alcohol phase.

6. The paint stripper formulation of claim 2 wherein pyrrole, d-limonene and anisole are incorporated in the benzyl alcohol phase.

7. A method as in claim 4 wherein a wax is also incorporated into the emulsion's benzyl alcohol phase.

8. A method as in claim 7 wherein pyrrole and d-limonene are incorporated into the emulsion's benzyl alcohol phase.

9. A method as in claim 7 wherein pyrrole and anisole are incorporated into the emulsion's benzyl alcohol phase.

10. A method as in claim 7 wherein pyrrole, d-limonene and anisole are incorporated into the emulsion's benzyl alcohol phase.

* * * * *